United States Patent Office

3,466,757
Patented Sept. 16, 1969

3,466,757
DRYING AND RECOVERY PROCESS
James L. Dunn, Jr., Lake Jackson, Tex., assignor to The Dow Chemical Company, Midland, Mich., a corporation of Delaware
Continuation-in-part of application Ser. No. 572,948, Aug. 17, 1966. This application Nov. 24, 1967, Ser. No. 685,716
Int. Cl. F26b 3/00; F16b 13/08
U.S. Cl. 34—22                                    1 Claim

ABSTRACT OF THE DISCLOSURE

A method and apparatus for removing a volatile, liquid solvent which is a conditioning agent or which contains a conditioning, coating or treating agent from a base material to which the solvent composition has been applied by contacting the so-treated base material with superheated vapors of a volatilizable organic liquid, said vapors being at a temperature at least 10° C. higher than the boiling point of said volatile, liquid solvent.

---

Figure 1:
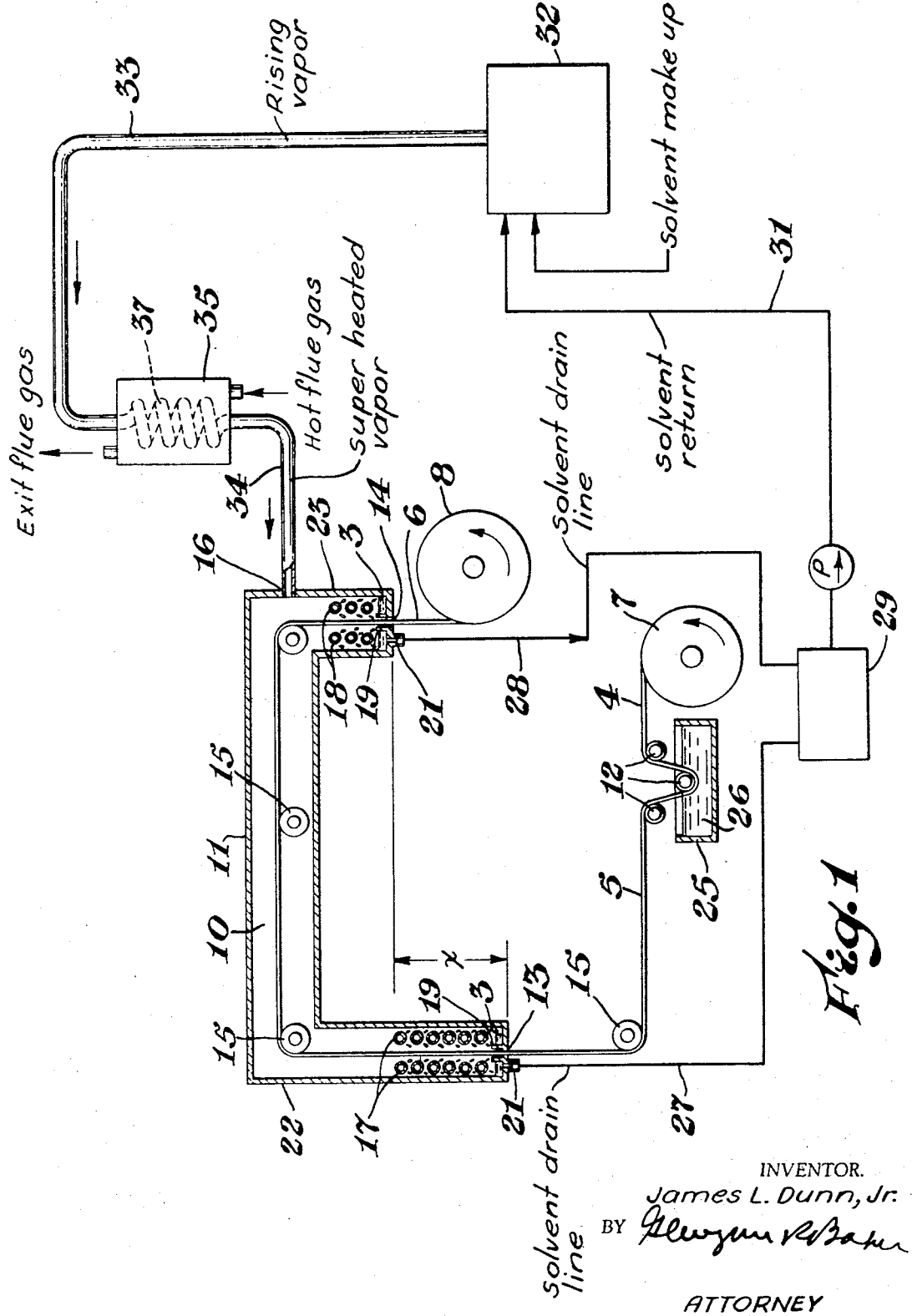

This application is a continuation-in-part of application, Ser. No. 572,948, filed Aug. 17, 1966, Patent No. 3,408,748.

Background of invention

Today there are numerous processes in which either as an incident thereto or as an object thereof, a base material is wetted by a volatile liquid solvent which contains a treating agent and which solvent must be removed from the base material leaving behind the treating agent thereby to produce a more useful product. As will be apparent to those skilled in the art, volatile solvents are frequently employed as solubilizing or dispersing mediums for coating compositions and treating reagents of various sorts, as well as for the purposes of dyeing, cleaning and conditioning the base material treated. Base materials which may for one reason or another be wetted with solvents include various textile products comprising natural and synthetic fibers, threads, yarns and the numerous fabrics that may be prepared. Paper and other wet-laid or matted products of cellulosic materials are examples of base materials which also are often contacted with volatile solvents which must be removed from the base material treated. Still other base materials which may be contacted with volatile solvents include products of polyolefins, polystyrenes and other plastics from which films, filaments, rods, boards, and shaped articles may be cast, extruded or molded. Still other base material products contacted by and thereby wetted with liquid solvents in various conditioning, extraction and treating processes include materials of natural origin such as wood, minerals, natural fiber and the like. In general, it may be said that there are numerous instances wherein solid base materials in the form of various shapes and constructions are wetted with a volatile liquid solvent, which can contain a treating agent, from which, after treatment, it is desired to remove and recover the solvent.

It is an object of the present invention to provide an improved process for removing volatile liquid solvents from base materials wetted with them. A particular object is to provide a highly effective continuous, solvent-drying process for constantly moving base material wherein the treated side of said base material is not disturbed during the drying process. More especially, it is an object to provide a continuous process for drying base materials wetted with volatile, liquid solvents, especially organic solvents, and recovering the solvent efficiently. A special object and benefit of the invention is to provide a process and an apparatus for drying solvent-wetted base materials with minimal incidental air pollution. The above objects and other benefits, as will become apparent hereinafter, are accomplished in the present invention.

Brief description of present invention

In accordance with the present invention, a process is provided for removing a volatile liquid solvent from a solid or base material wetted by the liquid solvent, without disturbing the surface of the base material to which the solvent is applied, comprising contacting said solvent-wetted solid or base material with superheated vapor of a volatilizable organic liquid, said vapor being at a temperature above the boiling point of the liquid solvent wetting said base material, preferably at least 10° C. above such boiling point. Such contacting is efficiently achieved by introducing the base material already wetted by the liquid solvent into a zone of superheated vapor of the volatilizable organic liquid, i.e. either maintaining it therein or passing it through the superheated vapor. Optionally, however, the material may be wetted by liquid solvent and dried within the same zone by the vapor.

The superheated vapor may be and preferably is the vapor of a liquid solvent identical to that solvent wetting the material to be dried. However, if desired, any second volatilizable organic liquid may be used as the source for the superheated vapors so long as the vapors thereof are sufficiently stable for superheating above the boiling point of the wetting solvent and essentially inert to the solid or base material and liquid wetting solvent.

The superheated vapor of the volatilizable organic liquid is readily generated by conventional methods for obtaining superheat. Thus one may employ a two-step process whereby the volatilizable organic liquid is heated to its boiling point and the vapor therefrom is conducted through a second heating means to impart superheat to the gases or vapor, or a one-step process where boiling liquid generates its own pressure and thus its own superheat when the pressure is reduced across a valve or orifice. Any superheating means wherein the vapor can be heated above the boiling point of the solvent wetting the base material is satisfactory for this purpose. The superheated vapor is then passed into a vapor confining zone wherein the base material wetted with the liquid solvent is contained. The contact time needed to achieve a desired removal of liquid solvent from the material to be dried will, of course, vary according to the temperature of the superheated vapor and the vapor contact efficiency with the surface of material to be dried.

Although drying of materials wetted with volatile liquid solvents can be accomplished in the presence of air, it is preferable to exclude air. According to the present invention, when operated to exclude air superior results, in terms of solvent recovery efficiencies and minimization of air pollution, are achieved by generating and superheating the volatilizable organic liquid vapor and then using it in the contact drying process. In effect, it is preferred to use an essentially air-free, superheated vapor. By "air-free," herein, is meant a vaporous atmosphere of a volatizable solvent containing less than 10% air by volume and preferably less than about 1% air. The presence of any significant amount of air in vapor at the boiling temperature of a boiling solvent will materially reduce the temperature at which condensate will be formed in such vapor. From the foregoing, it will be apparent that vapor containing air is not as easily condensed and recovered as that from which air is effectively excluded.

Detailed description of invention

In the accompanying drawing, the process of the invention is illustratively applied to the continuous drying of a constantly moving paper wetted with a volatile, halogenated organic solvent. The stripping solvent used is identical to the liquid solvent removed.

The basic process occurs within a superheated-vapor confining means, which essentially comprises a vertical, inverted U-shaped duct chamber 11 with an inlet 13 and outlet 14 for a continuous sheet of solvent wetted paper 5. Within the duct chamber 11 are sheet support rolls 15 which maintain the paper sheet within the duct chamber 11 on a given path. At the inlet end 13 of the duct chamber 11 is a high capacity cooling coil 17 upon which solvent 3 is condensed, and from which solvent 3 drains into a catch basin 19 with a liquid draw-down opening 21. At the outlet end 14 of the duct chamber 11 is a low capacity cooling coil 18. By this coil, a cold zone is maintained around the outlet 14 of the duct chamber 11 to condense the solvent vapor and prevent the escape of solvent vapor with the paper 6 leaving the apparatus.

The untreated paper 4 is fed from a feed roll 7 and passed through coating vessel 25 on guide rolls 12 wherein it is dipped in a liquid 26 comprising a treating agent dispersed in a volatile liquid solvent, for example a halogenated hydrocarbon solvent. The treated and solvent-wetted paper 5 is then passed into the vapor zone 10 defined by the duct chamber 11.

To this vapor zone 10 is charged superheated vapor of the volatilizable organic liquid. Preferably, but not necessarily, the volatilizable organic liquid is identical or similar to the volatile, liquid solvent to be removed from the paper 5. The superheated vapor is introduced into the duct chamber 11 at vapor inlet 16, which is just above the outlet cooling coil 18. Dry paper 6 is withdrawn from the duct chamber 11 at the outlet 14 onto a take up roll 8.

The superheated vapor generating means comprises a boiler 32 and a superheating means 35. The vapor from the boiler 32 is supplied through vapor line 33 to superheating means 35 for increasing the temperature of the vapor above its boiling point. In the illustration, hot flue gas is used to heat coil 37 through which vapor from the boiler 32 is passed. The superheated vapor is then introduced through superheated vapor lines 34 into the duct chamber 11 at vapor inlet 16 where it heats and vaporizes liquid solvent from the paper 5. Ultimately, the volatilizable organic liquid vapor and the vaporized volatile liquid solvent removed from the paper 5 are condensed on the cooling coils 17 and 18. From such coils 17 and 18 the condensed liquid drips into catch basins 19. It then flows through solvent drain lines 27 and 28 to solvent recovery or storage tank 29. For enonomy of operation, it is then recycled to the boiler 32 through feed line 31.

Because the cooling coil 17 is designed to provide a larger heat removal, the major portion of the vapor in the duct 11 is condensed in the zone of cooling coil in leg 22. The phenomenon of such condensation creates a natural flow of vapors in duct 11 toward leg 22 and cooling coil 17. Therefore, to provide maximum and efficient use of the superheat of the vapor of the volatilizable organic liquid the vapor is introduced into leg 23 above the cooling coil 18 at outlet 14 from duct 11. In this manner vapor flow is set up counter-current to the direction of paper movement within the duct chamber 11. The difference in the lengths of the inlet leg 22 and the outlet leg 23 of duct chamber 11, i.e., X, represents a difference in static vapor head which aids in equalizing pressure at the inlet and outlet ends. This difference should be sufficient to counteract the pressure differential generated by the constant movement of paper through the duct chamber 11.

In the practice of the invention, volatilizable organic liquids employed to create the superheated vapor include any volatile liquid, which has a boiling point above 10° C. and which can be superheated alone to a temperature above boiling point to produce vapors stable at temperatures above the boiling point of the liquid solvent wetting the material to be dried. Preferably, volatilizable organic liquids are used which produce dense vapors, e.g., having a density greater than air, to maximize the ease of vapor condensation and recovery. Since the higher density vapors have greater heat, they accomplish more drying per given volume of vapor than air.

The volatilizable organic liquids which are suitable in accordance with the present invention to produce the superheated vapor include the liquid halogenated organics such as the fluorinated, chlorinated and brominated aliphatic and cycloaliphatic hydrocarbons, specifically the fluorocarbons 113, 114B, 112, TF, perchloroethylene trichloroethylene, 1,1,1-trichloroethane, methylene chloride, and carbontetrachloride. In addition, however, aromatic hydrocarbons, and even higher boiling aliphatic and aromatic hydrocarbons such as naptha, toluene, benzene, hexane, pentane, gasoline and the like can be used effectively to generate superheated vapors. It is preferred to employ the halohydrocarbons because of their non-flammable nature. It is further preferred to employ the chlorinated hydrocarbons because of their relative lower cost and their ease of recovery.

The volatile liquid solvent, i.e. the solvent to be removed from the solvent-wetted material, may be any volatile liquid solvent and in general it should be inert to the volatilizable organic liquid. As previously mentioned, it is desirable to select a volatilizable organic liquid identical or at least similar in properties to the volatile liquid solvent to be removed, but this is not necessary to successful practice of the invention. When the volatilizable organic liquid differs from the volatile liquid solvent, the condensate collected at collection basins 19 can be distilled to recover each liquid for recycle and further use.

Figure 2:
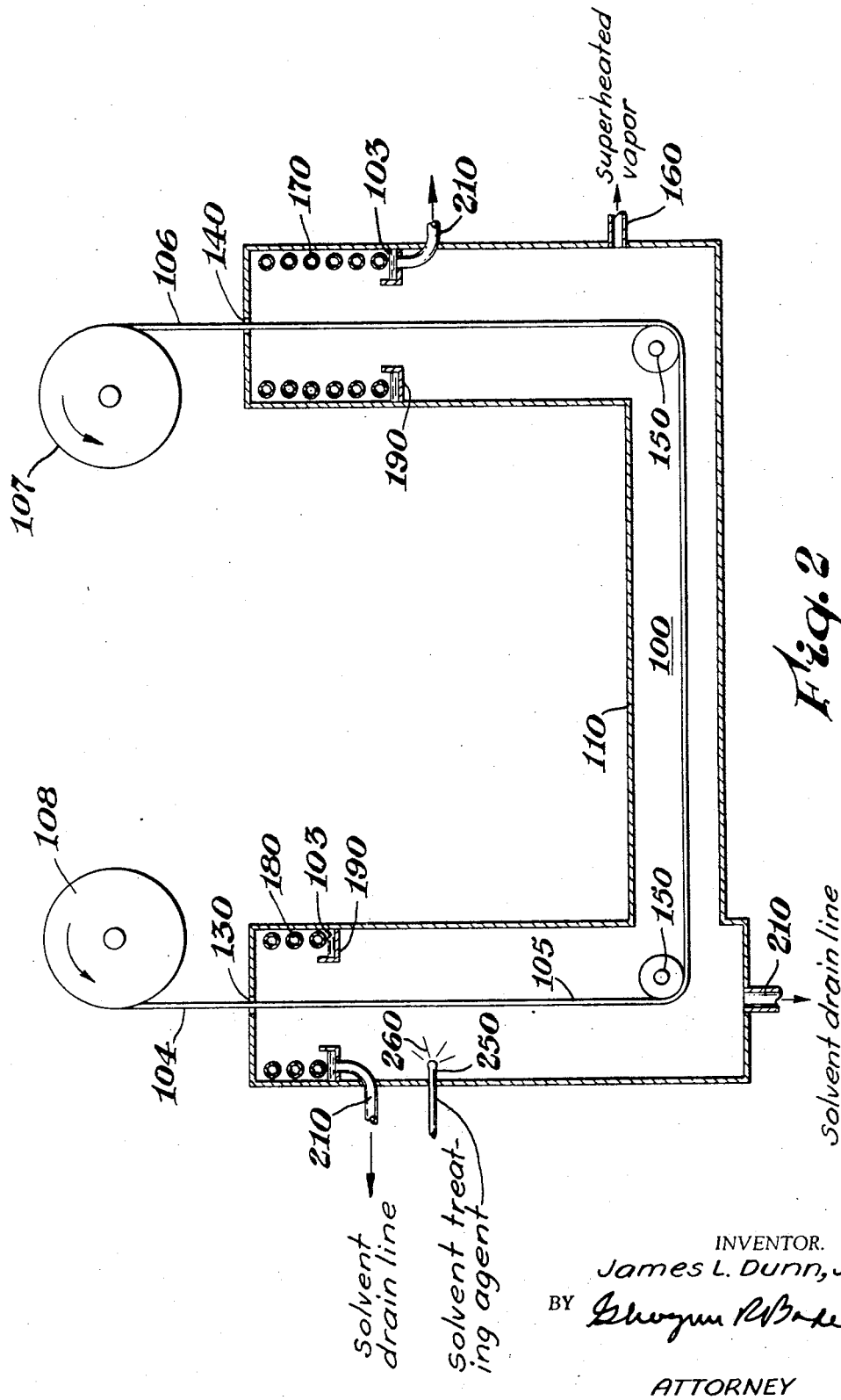

An alternative apparatus for carrying out the basic process of the present invention is illustrated in FIGURE 2 of the drawings. When the volatile, liquid solvent-treating composition can be applied by spray technique the apparatus comprises a vertical, U-shaped duct chamber 11 with an inlet 130 and outlet 140 for a continuous sheet of solvent wetted paper 105. Within the duct chamber 110 are sheet support rolls 150 which maintain the paper sheet within the duct chamber 110 on a given path. At the inlet end 130 of the duct chamber 110 is a high capacity cooling 180 upon which solvent 103 is condensed, and from which solvent 103 drains into a catch basin 190 with a liquid draw-down opening 210. At the outlet end 140 of the duct chamber 110 is a low capacity cooling coil 170. By this coil, a cold zone is maintained around the outlet 140 of the duct chamber 110 to condense the solvent vapor and prevent the escape of solvent vapor with the paper 106 leaving the apparatus.

The untreated paper 104 is fed from a feed roll 108 and passed into the duct 110 through inlet 130 wherein it is sprayed from spray nozzles 250 with a liquid 260 comprising a treating agent dispersed in a volatile liquid solvent, preferably liquid halogenated hydrocarbon solvent. The treated and solvent wetted paper 105 is than passed into the vapor zone 100 defined by the duct chamber 110.

To this vapor zone 100 is charged superheated vapor of the volatilizable organic liquid. Preferably, but not necessarily, the volatilizable organic liquid is identical or similar to the volatile, liquid solvent to be removed from the paper 105. The superheated vapor is introduced into the duct chamber 110 at vapor inlet 160, which is just below the outlet cooling coil 180. Dry paper 106 is withdrawn from the duct chamber 110 at the outlet 140 onto a take up roll 107.

The superheated vapor generating means comprises a similar arrangement as shown in FIGURE 1 and is not illustrated in FIGURE 2.

In effect, the invention provides a novel drying process, which when carried out in a preferred manner so as to avoid introducing any air into the contact zone between the superheated vapor and solvent watted material to be dried, excellent solvent recovery, and thus low air pollution, are achieved in the practice of the invention.

The invention is particularly well adapted to the treatment of continuous sheet materials including paper, plastics, metal foils, fabrics, fibers and the like materials which may be passed continuously through a superheated vapor contact zone. It is also applicable, however, to batch treatment of solvent wetted materials.

Most efficient use of the superheated vapor is achieved by flowing such vapor counter current to the direction of the solvent wetted feed stock. For this purpose, a flowing confined stream of superheated vapor can be established in a duct as illustrated in the drawing that is, by cooling the vapors at the inlet and outlet of a duct. A stream of vapor can also be established by other means, such as fans in closed ducts to maintain a continuous recycling stream of vapor. Such a closed duct would have appropriately space condensate removal traps. To minimize vapor escape, the feed stock such as a continuous strip of paper, plastic or fabric may be admitted to the vapor contact zone through a mechanical seal.

What is claimed is:

1. In a method for treating a base material including sheets, webs and films of natural and synthetic fibers and resins which comprises:
   (1) treating the base material with a suspension, dispersion or solution of a treating agent in a volatile, liquid, chlorohydrocarbon carrier, and
   (2) removing the carrier by evaporation thereof from the base material in a heated zone to leave the treating agent upon the surface or within the base material,
the improvement which consists of
   (a) establishing a zone of vapors of a volatile liquid chlorohydrocarbon below an inlet and outlet to said zone;
   (b) introducing vapors into said zone at a temperature at least about ten (10° C.) degrees centigrade above the boiling point of the carrier;
   (c) removing vapors in excess of that required to maintain the zone full of said vapors by condensing said vapors at the inlet and outlet to said zone, which outlet and inlet is above said vapor entrance;
   (d) introducing the base and its treating agent in the carrier into the zone of the superheated vapors;
   (e) passing said material through said zone;
   (f) removing the carrier as a vapor from the zone along with the superheated vapors by condensing the so-removed vapors, at the inlet and outlet to said zone, returning the organic liquid as superheated vapor to the zone, and withdrawing the base material with said treating agent from said zone free of carrier.

References Cited

UNITED STATES PATENTS

| | | | |
|---|---|---|---|
| 1,294,066 | 2/1919 | DuPont | 34—27 |
| 2,198,412 | 4/1940 | McDonald. | |
| 1,654,553 | 1/1928 | Neidich | 34—78 |
| 2,443,443 | 6/1948 | Chavannes | 34—77 |
| 3,087,254 | 4/1963 | Kueodera | 34—27 XR |

KENNETH W. SPRAGUE, Primary Examiner

U.S. Cl. X.R.

34—75